(12) United States Patent
Babin

(10) Patent No.: US 6,289,913 B1
(45) Date of Patent: Sep. 18, 2001

(54) SERVO MOTOR OPERATED ROTARY BYPASS VALVE

(75) Inventor: Christopher J. Babin, Rochester Hills, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/469,396

(22) Filed: Dec. 22, 1999

(51) Int. Cl.[7] .................................................. F16K 27/10
(52) U.S. Cl. ............................................ 137/15.18; 264/68
(58) Field of Search .......................... 137/15.18, 15.19; 156/73; 264/68

(56) References Cited

U.S. PATENT DOCUMENTS 4,844,112 * 7/1989 Pick et al. .............................. 137/15
6,029,685 * 2/2000 Carruth ................................... 137/15

* cited by examiner

Primary Examiner—John Fox
(74) Attorney, Agent, or Firm—Roger A. Johnston

(57) ABSTRACT

A motorized bypass valve having a valve body with cylindrical valving chambers with a single inlet and a first and second outlet ported to the chamber, such with convexo-concave face seals disposed over the ports. A rotary valving member having a partial cylindrical valving surface is disposed in the valving chamber and valving surface contacting the face seals. A motor housing is then spin welded onto the valve body to seal the valving chamber with the half shaft of the valving member extending into the motor housing and sealed by an O-ring. The motor and gear train are then assembled into the housing for driving the half shaft. The motor housing is closed by a cover welded thereover.

2 Claims, 4 Drawing Sheets

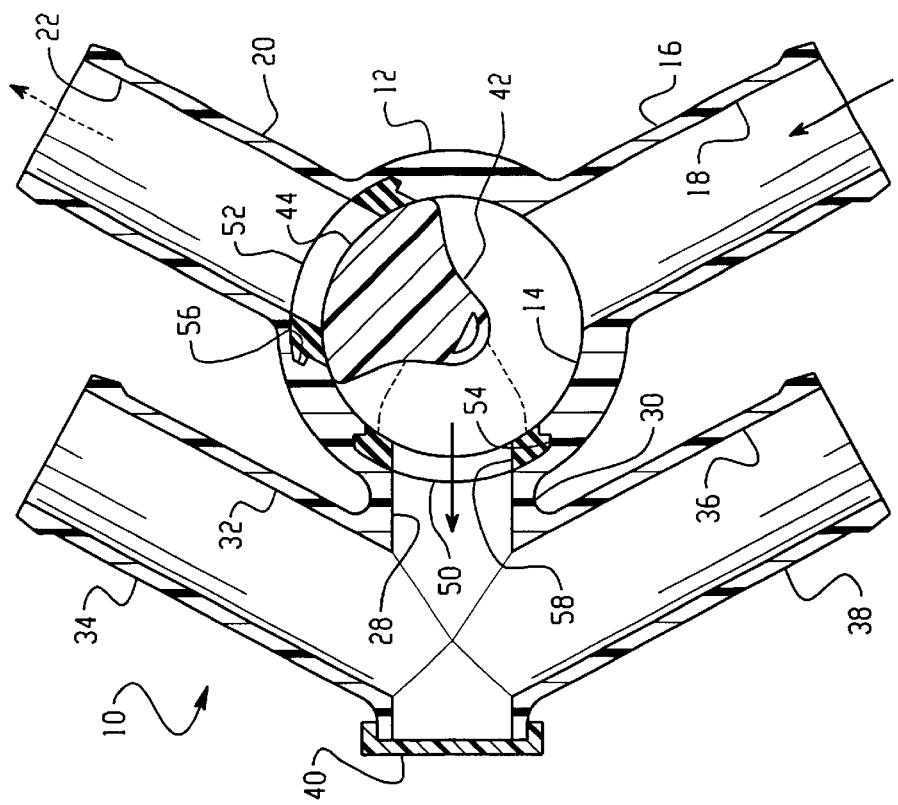
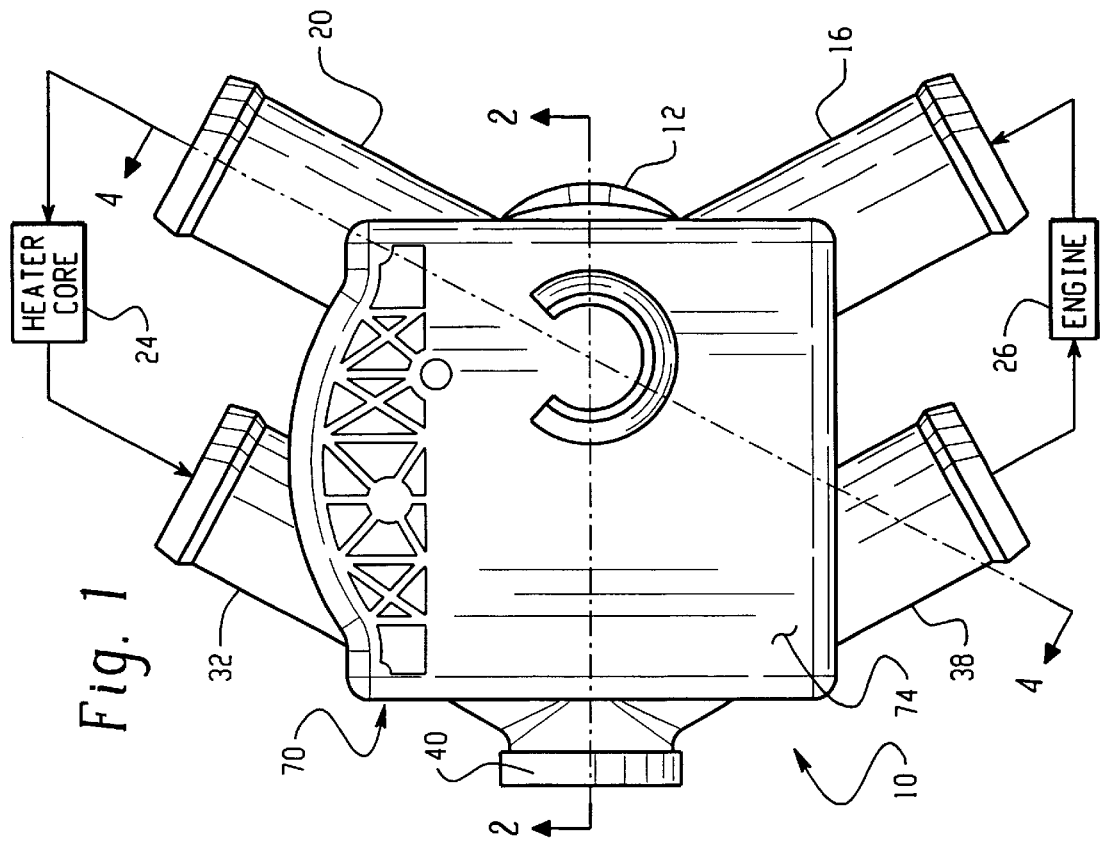

Fig. 5

SERVO MOTOR OPERATED ROTARY BYPASS VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to servo motor operated valves and particularly electrically operated valves of the type having a single inlet and plural outlets wherein a rotary valve member is progressively moved from an initial position blocking flow to one of the outlets and diverting flow to the remaining outlets progressively through positions permitting increasing flow through the one outlet and decreasing flow through the remaining outlets until full flow is directed through the one outlet.

Valves of this type are typically employed in a fluid flow circuit wherein it is desired in certain modes of operation to divert or bypass a portion of the flow for control purposes to a working fluid circuit and to divert the remainder of the flow away from the working load circuit such as to a sump or pump return.

The aforesaid type of bypass or diverted flow is desired in controlling flow of hot water or engine coolant to a heat exchanger or heater core for a motor vehicle passenger compartment climate control system, typically for heating the passenger compartment. In such automotive passenger compartment heaters, it is desired to control flow of the hot water to the heater core by diverting or bypassing a portion of the flow to the heater and directing the remaining portion to return to the engine coolant circuit or engine water pump inlet. Such an arrangement provides for accurate control of the flow of hot water to the heater core and thus gives the desired resolution of temperature control of the passenger compartment.

Heretofore bypass water valves for motor vehicle passenger compartment heater cores have typically been of the butterfly or rotary vane type which, have been employed because of their simplicity and low manufacturing cost, but which have the disadvantage or drawback of providing full flow between the closed position and about one-fourth of the full open position of the butterfly. This high gain change of flow with respect to rotary valve movement has caused the butterfly member in the valve to require a very fine control of its rotary position.

Where it has been desired to provide an electronically controlled automatic temperature control system for the vehicle passenger compartment, utilization of a motorized actuator for the bypass water valve has required extremely fine resolution of the motor actuator output and thus has proven to be difficult and costly with respect to the overall cost of the valve and heater system.

Thus, it has been desired to provide a bypass water valve for motor vehicle passenger compartment heater systems which provides accurate control of the flow and fine resolution of the flow with respect to movement of the valving member. It has further been desired to provide a linear relationship between the rotary movement of the valving member and the change in the diverted flow through the valve to the working load circuit.

Known servo motor actuated rotary water valves have required separate fasteners to attach the motor drive unit to the valve body, utilizing a sealing gasket and has the disadvantage of being a source of leakage and being costly in high volume mass production. It has thus been desired to provide such a servo motor actuated rotary valve for heater bypass flow control which provides linearity of control, simplicity of design and ease of assembly, robustness as to fluid seal integrity and reduced manufacturing cost.

BRIEF SUMMARY OF THE INVENTION

The present invention provides a servo motor actuated bypass type rotary valve which has a simplified construction eliminating fasteners for the assembly of servo motor unit and valve body, has linearity of flow response and which is low in manufacturing cost and reliably sealed and thus robust in service. The servo motor actuated valve of the present invention employs a cylindrical valving chamber with a partially valving member having a partially cylindrically-shaped valving surface rotated over face seals provided at each of the valve outlets. The servo motor is operative to rotate the valving member from a position blocking one outlet to a position at least partially blocking the outlet and progressively to a position fully opening the one outlet and blocking the remaining outlet. The valve body has the valving member and face seals for each of the outlet ports assembled into the valving chamber as a subassembly and an annular seal ring is provided between the valving member and the housing. The servo motor housing is then attached to the body subassembly by spin welding the housing onto the valve body about the valving member. Subsequently the motor and gear train are assembled into the housing which is closed over the motor and gear drive by a cover welded to the housing.

The valve of the present invention thus provides a linearly responding diverter valve having a simplified assembly, low cost with seal integrity for the valve body and valving chamber which employs spin welding for attachment of the servo motor to the valve body.

BRIEF DESCRIPTION OF THE DRAWINGS

FIG. 1 is a plan view of the valve assembly of the present invention;

FIG. 3 is a section view taken along section indicating lines 3—3 of FIG. 2;

DETAILED DESCRIPTION OF THE INVENTION

Figure 2:
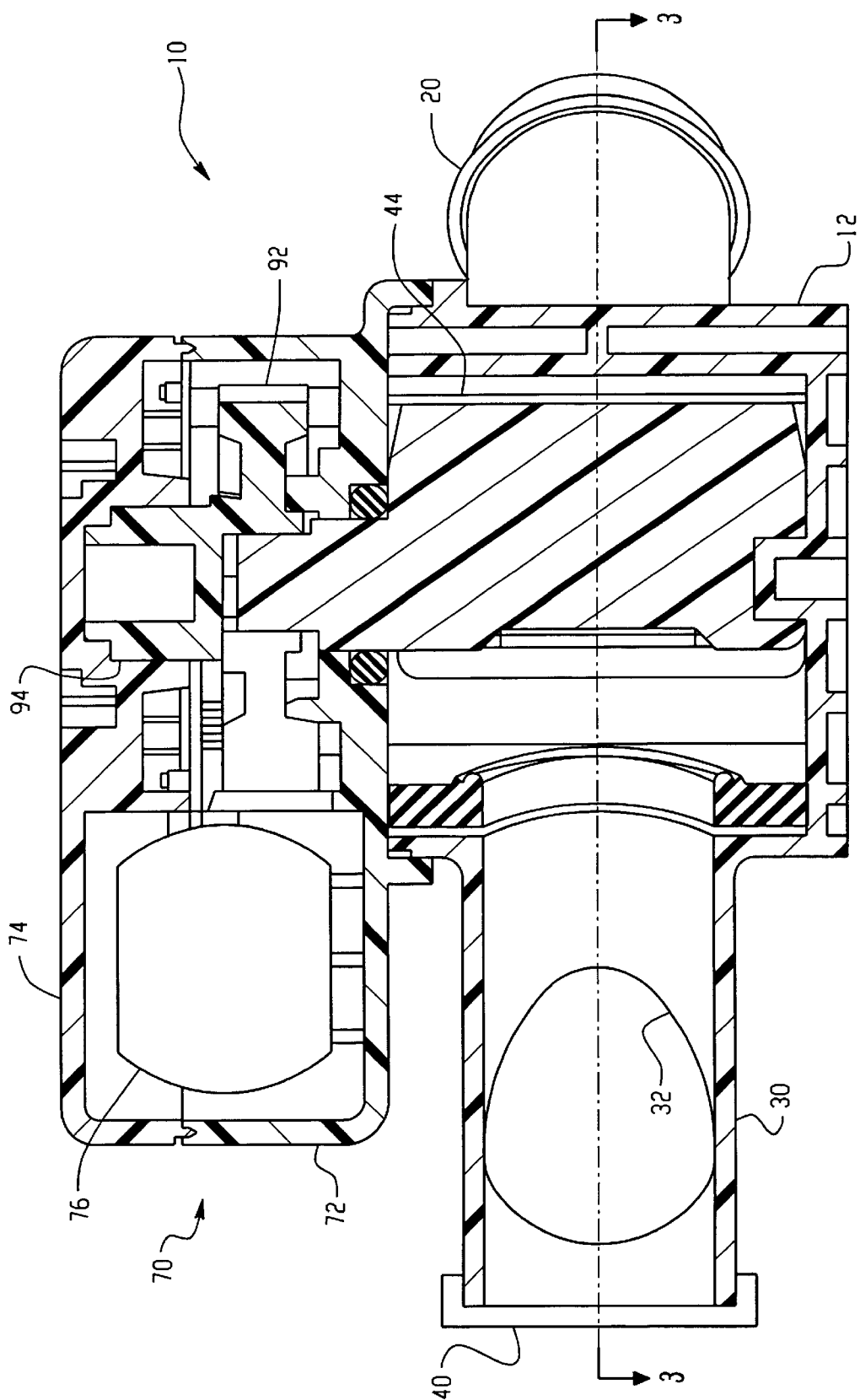
FIG. 2 is a section view taken along section indicating lines 2—2 of FIG. 1.
Figure 4:
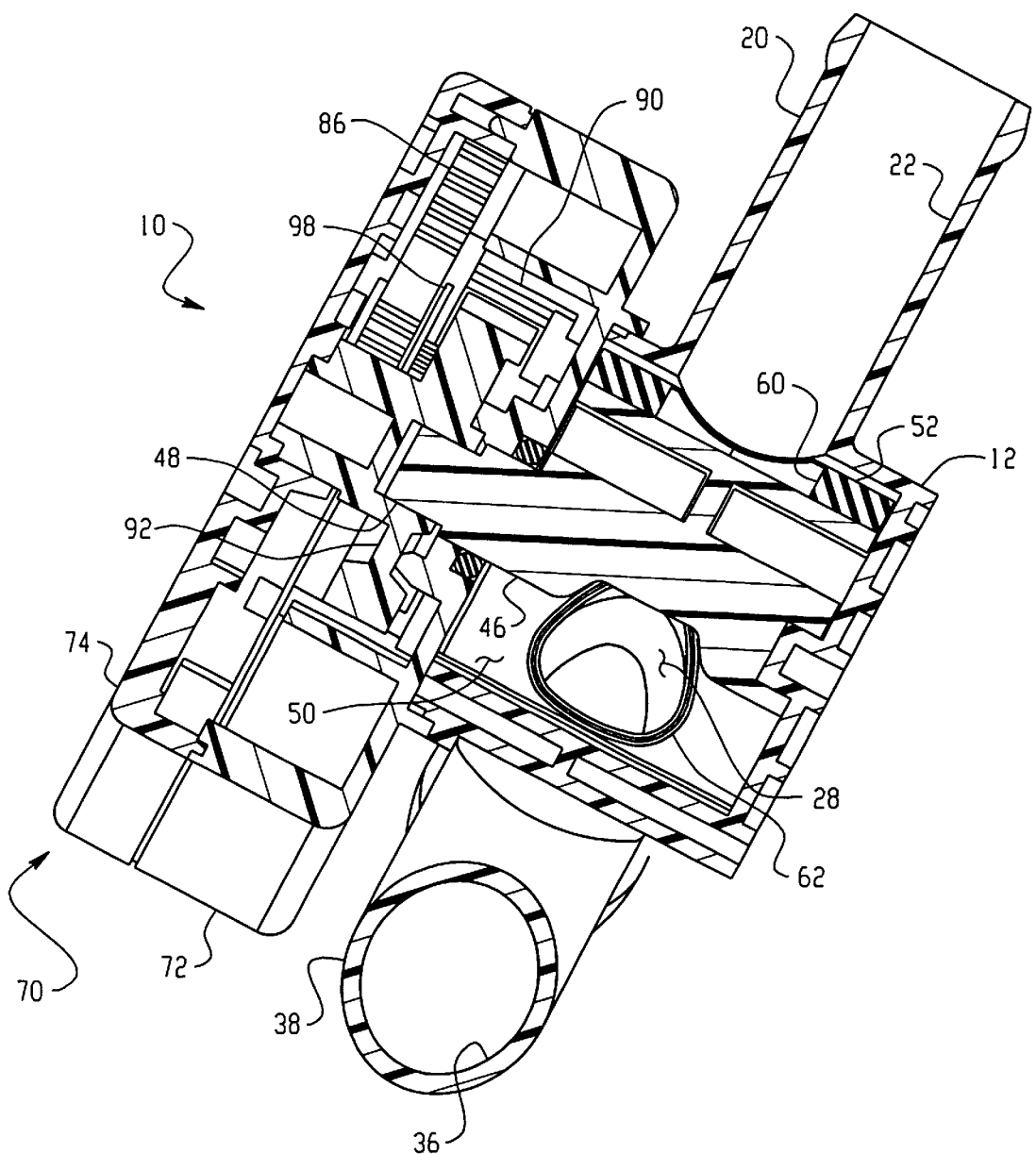
FIG. 4 is a section view taken along section indicating lines 4—4 of FIG. 1; and, FIG. 5 is an exploded view of the assembly of FIG. 1.
Figure 5:
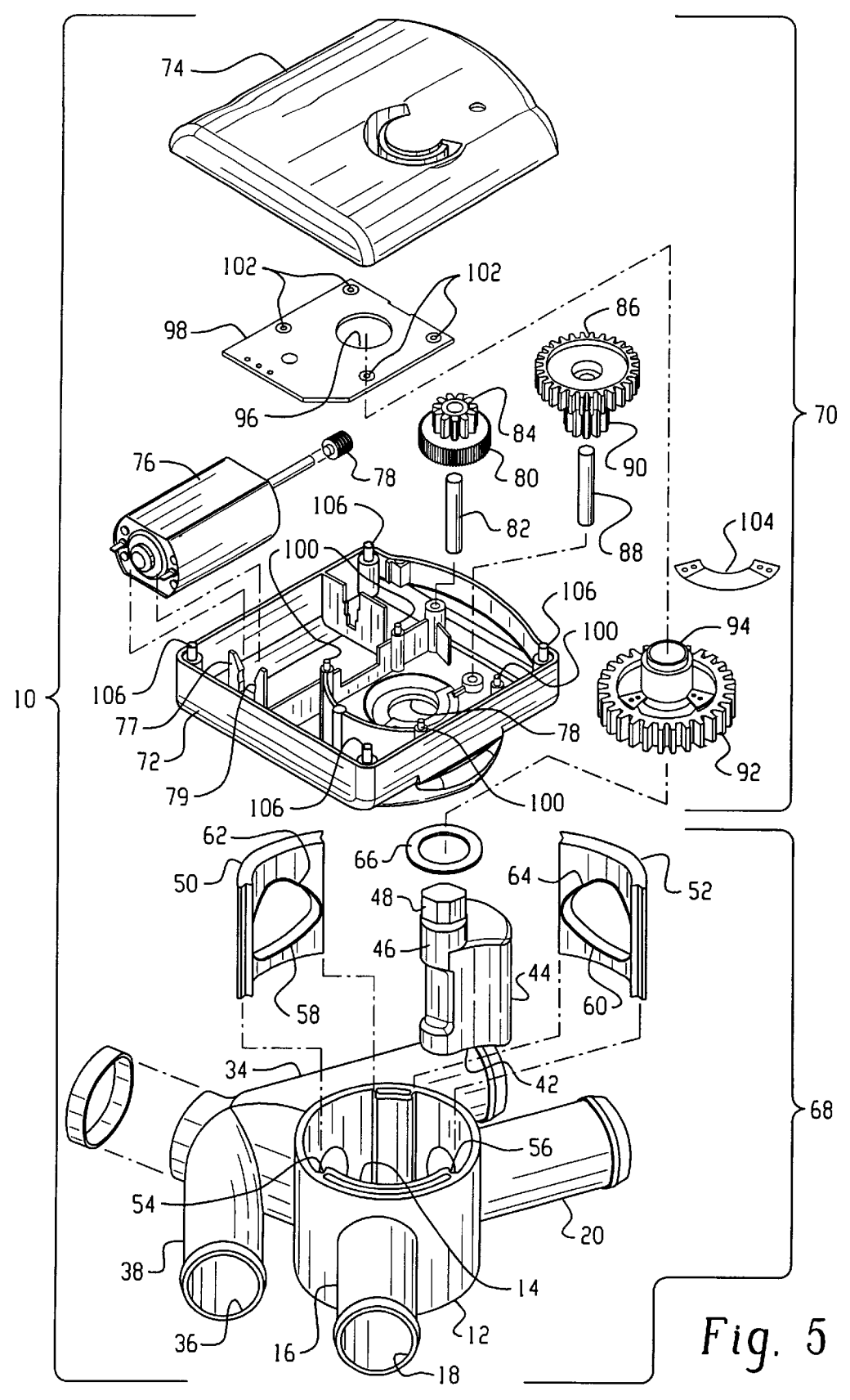

Referring to FIGS. 1 through 5, the valve assembly of the present invention is indicated generally at 10 and includes a valve body 12 having a cylindrical valving chamber 14 formed therein with an inlet fitting 16 having an inlet passage 18 formed therein which communicates with the valving chamber 14. Body 12 has a primary outlet fitting 20 having therein an outlet passage 22 which communicates with valving chamber 14; and, fitting 20 is adapted for connection to a working fluid load circuit such as the inlet of a vehicle heater core 24. Inlet fitting 16 is adapted for connection to a source of fluid as, for example, a tap in the water jacket of an engine 26.

Valve body 12 has a bypass or secondary outlet passage 28 formed therein which communicates through a fitting 30 with secondary or bypass channel 32 formed in connector fitting 34 and also with channel 36 formed in connector 38. Connector 34 is adapted for connection to the return from the working fluid circuit such as the outlet of heater core 24; and, fitting 38 is adapted for providing return flow to the source, as for example, the return flow inlet to the supply, such as the inlet of the engine coolant water pump.

In the presently preferred practice, the body 12 including fittings 16, 20, 34, 38 and fitting 30 is formed integrally as a single piece with valving chamber 14 formed therein. Passage 28 is closed by a closure or a cap 40 secured thereover by any suitable expedient, as for example, adhesive sealant or weldment. In the present practice of the invention, the body, cap and fittings are made of suitable plastic material, as for example, polyamide material filled about one-third by volume with glass particles.

A rotary valving member 42 having a partial cylindrical valving surface 44 formed thereon and a half shaft 46 extending therefrom with driving surfaces 48 provided thereon. An annular resilient seal ring 66 is received over half shaft 46 in sealing engagement therewith. Member 42 is received in valving chamber 14 for rotation therein with half shaft 46 extending outwardly from chamber 14.

A first and second convexo-concave or partially cylindrical face seal members 50, 52, formed of resilient seal material, as for example, elastomeric material have spaced parallel sides or margins which are each received in a pair of grooves provided in the valving chamber wall and denoted by reference numerals 54, 56. Each of the seal members 50, 52 has a flow aperture denoted respectively 58, 60 formed therethrough and which has an annular lip or rib formed thereabout on the interior or concave face thereof as denoted respectively by reference numerals 62, 64.

The assemblage of the body 12, seals 50, 52, valving member 42 and seal ring 66 comprise a subassembly indicated generally at 68.

A servo motor drive unit indicated generally at 70 includes a housing shell 72 and cover 74 with a motor 76 mounted in the shell 72.

The motor unit 70 is a built up assembly in housing shell 72. Housing shell 72 has an aperture 78 formed in the bottom thereof which is received over the half shaft 46 in clearance arrangement therewith; and, the housing shell 72 is secured over the valving chamber 14 and to the subassembly 68 by spin welding so as to seal chamber 14 and secure the housing 72 to the body 12. It will be understood that during the spin welding operation, the housing 72, seal ring 66 rotates with respect to valving member 42; and, seal ring 66 seals between half shaft 46 and aperture 78.

After the spin welding of housing shell 72 to subassembly 68, the motor 76 is placed in housing shell 72 and secured therein between mounts 77, 79. The motor 76 has an output worm 78 on the shaft thereof which engages a first stage driven gear 80 mounted on axle pin 82 which is secured in the housing shell 72. Gear 80 has provided thereon a first stage pinion 84 which engages a second stage gear wheel 86 mounted on axle pin 88 secured in the housing 72. Gear wheel 86 has thereon a second stage pinion 90 which engages an output gear 92 which is received over half shaft 46 and has the hub 94 thereof drivingly engaging surfaces 48. Output gear hub 94 is journalled in an aperture 96 formed in a deck plate 98 which is secured to housing shell 72 over locating lugs 100 and retained thereon by any suitable expedient, as for example, by heat staking of the lugs through apertures 102 formed in the deck plate 98. If desired, a resistor (not shown) may be provided on the undersurface of deck plate 98 and wiped with an electrical wiper contact 104 provided on the output gear 92 thereby forming a potentiometer for providing a position feedback signal for output gear 92 and shaft 46.

Upon completion of the assembly of the motor 76 and associated gears in the housing 72, cover 74 is received thereover and engages pegs 106 provided on the housing 72 and is secured thereto by any convenient technique, as for example, by sonic weldment.

The present invention thus provides a low cost and reliably sealed bypass type rotary valve which has a partial cylindrical valving surface slidably contacting face seals disposed over radial valve ports in a cylindrical valving chamber and which provides substantially linear control of the flow with respect to the rotary position of the valving member. A servo motor housing shell is spin welded to the valve body to close the valving chamber after assembly of the valving member and seals in the valve body as a subassembly. The servo motor and gear train are then assembled in the housing shell. The present invention thus provides a simple to construct, relatively low cost, reliably sealed bypass valve with substantially linear response to an electrical input signal for the servo motor and which is particularly suitable for use as a heater core water bypass valve in a motor vehicle passenger compartment climate control system.

Although the invention has hereinabove been described with respect to the illustrated embodiments, it will be understood that the invention is capable of modification and variation and is limited only by the following claims.

What is claimed is:

1. A method of making a servo-operated rotary valve assembly comprising:

(a) forming a valve body with a valving chamber having an inlet and a first and second outlet port;

(b) disposing a resilient seal about each of said outlet ports;

(c) disposing a valve member in said chamber and engaging said member with said seal and forming a subassembly;

(d) attaching a servo motor housing to said subassembly by spin welding said housing to said body; and, (e) installing a motor in said housing after said welding and drivingly connecting said motor to said valve member.

2. The method defined in claim 1, wherein said step of attaching a servomotor housing includes welding a cover to said housing after said step of disposing a servo motor in said housing.

* * * * *